US011584177B2

(12) United States Patent
Niewiadomski et al.

(10) Patent No.: US 11,584,177 B2
(45) Date of Patent: Feb. 21, 2023

(54) FIXED OFFSET METHOD FOR HITCH DETECTION IN HITCH ASSIST OPERATION

(71) Applicant: Ford Global Technologies, LLC, Dearborn, MI (US)

(72) Inventors: Luke Niewiadomski, Dearborn, MI (US); Nikhil Nagraj Rao, Cupertino, CA (US); Lihui Chen, Rochester Hills, MI (US); Roger Arnold Trombley, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 684 days.

(21) Appl. No.: 16/570,105

(22) Filed: Sep. 13, 2019

(65) Prior Publication Data
US 2021/0078374 A1 Mar. 18, 2021

(51) Int. Cl.
| | |
|---|---|
| *B60D 1/36* | (2006.01) |
| *B60W 10/20* | (2006.01) |
| *B60W 10/18* | (2012.01) |
| *B60W 50/14* | (2020.01) |
| *B60W 30/18* | (2012.01) |
| *G05D 1/02* | (2020.01) |
| *B62D 13/00* | (2006.01) |
| *B60D 1/04* | (2006.01) |
| *B60W 30/10* | (2006.01) |
| *B60D 1/58* | (2006.01) |

(52) U.S. Cl.
CPC ............... *B60D 1/366* (2013.01); *B60D 1/04* (2013.01); *B60D 1/36* (2013.01); *B60W 10/18* (2013.01); *B60W 10/20* (2013.01); *B60W 30/10* (2013.01); *B60W 30/18036* (2013.01); *B60W 50/14* (2013.01); *B62D 13/00* (2013.01); *G05D 1/021* (2013.01); *G05D 1/0225* (2013.01); *B60D 1/58* (2013.01); *B60W 2420/42* (2013.01)

(58) Field of Classification Search
CPC . B60D 1/366; B60D 1/04; B60D 1/36; B60D 1/58; B60W 10/18; B60W 10/20; B60W 30/10; B60W 30/18036; B60W 50/14; B60W 2420/42; B62D 13/00; G05D 1/021; G05D 1/0225
See application file for complete search history.

(56) References Cited

U.S. PATENT DOCUMENTS 9,102,271 B2  8/2015 Trombley et al.
9,821,845 B2  11/2017 Xu et al.
(Continued)

FOREIGN PATENT DOCUMENTS

JP   2017076833 A  *  4/2017
WO  WO-2018150642 A1  *  8/2018 ............... B60D 1/36

*Primary Examiner* — Dale W Hilgendorf
(74) *Attorney, Agent, or Firm* — Lorne Forsythe; Price Heneveld LLP

(57) ABSTRACT

A system for assisting in aligning a vehicle for hitching with a trailer includes a steering system that adjusts a vehicle steering angle, a braking system that adjusts a vehicle speed, an imaging system that receives image data of a drawbar assembly being receivable in a hitch receiver, and a controller. The controller is configured to detect an edge of the drawbar assembly from the image data, target an endpoint at a fixed offset from the edge and a stationary point on the vehicle, and maneuver, via the steering and braking systems, the vehicle along a path to align the endpoint with the trailer.

20 Claims, 10 Drawing Sheets

(56) References Cited

U.S. PATENT DOCUMENTS

| | | | |
|---|---|---|---|
| 10,780,752 B1* | 9/2020 | Niewiadomski | B60D 1/62 |
| 2010/0324770 A1 | 12/2010 | Ramsey et al. | |
| 2014/0200759 A1* | 7/2014 | Lu | B60D 1/245 |
| | | | 701/28 |
| 2014/0218506 A1* | 8/2014 | Trombley | B60D 1/245 |
| | | | 348/113 |
| 2017/0076833 A1 | 3/2017 | Lin et al. | |
| 2018/0081370 A1 | 3/2018 | Miller et al. | |
| 2018/0215382 A1 | 8/2018 | Gupta et al. | |
| 2019/0092109 A1* | 3/2019 | Carpenter | B62D 6/001 |
| 2019/0337343 A1* | 11/2019 | Ramirez Llanos | B60D 1/36 |
| 2019/0339704 A1* | 11/2019 | Yu | G06T 7/174 |
| 2020/0079165 A1* | 3/2020 | Niewiadomski | G05D 1/0246 |
| 2021/0061280 A1* | 3/2021 | Niewiadomski | G05D 1/0225 |
| 2021/0339588 A1* | 11/2021 | Takahama | B60D 1/36 |

* cited by examiner

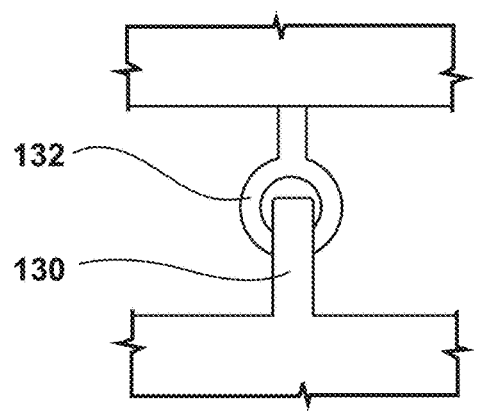
FIG. 11
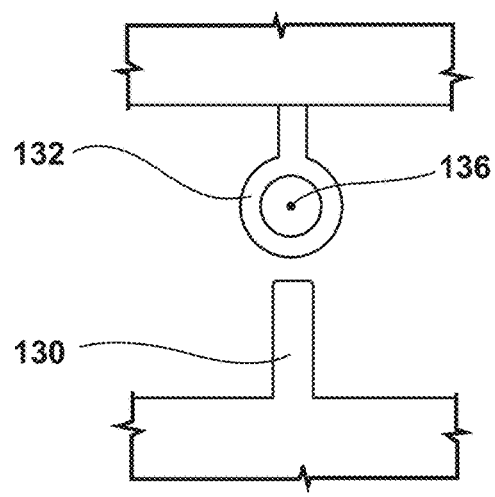 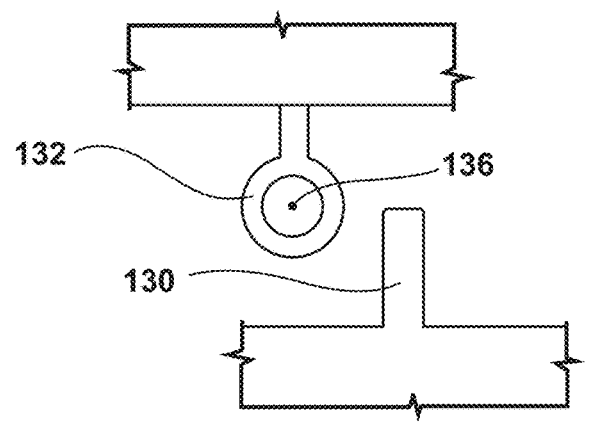
FIG. 12        FIG. 13

FIXED OFFSET METHOD FOR HITCH DETECTION IN HITCH ASSIST OPERATION

FIELD OF THE DISCLOSURE

The present invention generally relates to a vehicle hitch assistance system. In particular, the system targets a hitch point at a fixed offset from the edge and a stationary point on the vehicle, and maneuvers the vehicle along a path to align the hitch point with a trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE DISCLOSURE

According to one aspect of the present disclosure, a system for assisting in aligning a vehicle for hitching with a trailer comprises a steering system that adjusts a vehicle steering angle, via a braking system that adjusts a vehicle speed, an imaging system that receives image data of a drawbar assembly and a controller. The controller is configured to detect an edge of the drawbar assembly from the image data, target a hitch point at a fixed offset from the edge and a fixed point on the vehicle, and maneuver, via the steering and braking systems, the vehicle along a path to align the hitch point with a coupler of the trailer.

According to another aspect of the present disclosure, a hitch assist system for a vehicle comprises an imaging system configured to detect an edge of a drawbar assembly being receivable in a hitch receiver as image data and a controller. The controller is configured to, responsive to the image data being indicative of the edge of the drawbar assembly, target a hitch point by applying an offset value to the edge, and maneuver, via steering and braking systems, the vehicle along a path.

According to yet another aspect of the present disclosure, a method for aligning a vehicle for hitching with a trailer comprises detecting an edge position of a drawbar assembly in image data received from a vehicle imaging system, targeting a center of a hitch feature by applying an offset value to the edge position, and controlling steering and braking systems to maneuver the vehicle along a path.

Embodiments of the first aspect of the invention can include any one or a combination of the following features:
a steering system that adjusts a vehicle steering angle;
a braking system that adjusts a vehicle speed;
an imaging system that receives image data of a drawbar assembly being receivable in a hitch receiver;
a controller that detects an edge of the drawbar assembly from the image data, targets a hitch point at a fixed offset from the edge and a fixed point on the vehicle, and maneuvers, via the steering and braking systems, the vehicle along a path to align the hitch point with a coupler of the trailer;
an interface networked with the imaging system and the controller such that interaction with the interface activates a mode to indicate a specific hitch type to at least one of the imaging system and the controller;
the mode includes matching the image data to an image database such that the controller determines a type of the coupler of the trailer from the image data via a contact detection system, wherein the controller detects, via the contact detection system, contact between a pintle hitch attached with the drawbar assembly and a ring comprising an operative portion of the coupler, and, responsive to contact between the pintle hitch and ring, controls the braking system to bring the vehicle to a stop;
the controller, responsive to contact between the pintle hitch and the ring, outputs a notification to an interface networked with the controller, the notification being indicative of verification instructions to mate the pintle hitch and the ring;
the controller, responsive to the image data indicative of the edge of the drawbar assembly, calculates, via the imaging system, a height from a ground surface to each of a pintle hitch attached with the drawbar assembly and a ring comprising an operative portion of the coupler, and compares the height from the ground surface from each of the pintle hitch and the ring; and
the controller, responsive to the height of each of the pintle hitch and the ring, alters the path from the hitch point to a point proximate an exterior of the ring.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 11 is an overhead schematic of the vehicle showing an alignment of a specific hitch type, according to one aspect of the disclosure;

FIG. 12 is an overhead schematic view of the vehicle showing misalignment between the specific hitch type and the trailer, according to one aspect of the disclosure;

FIG. 13 is an overhead schematic view of the vehicle during a subsequent step of the alignment sequence with the trailer and showing an adjusted position of the specific hitch type and the trailer, according to one aspect of the disclosure.

DETAILED DESCRIPTION OF THE PREFERRED EMBODIMENTS

Figure 1:
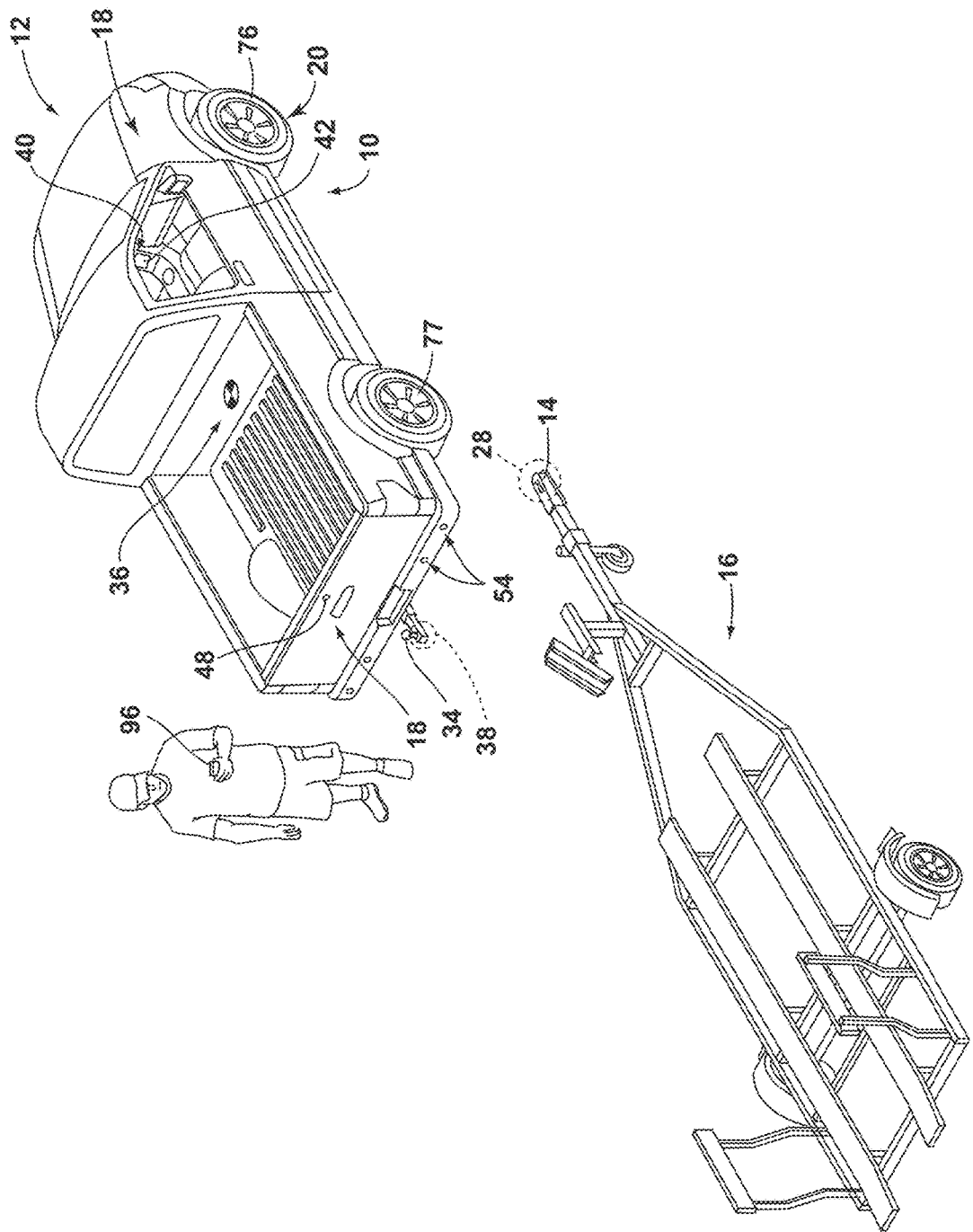
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring generally to FIGS. 1-14, reference numeral 10 designates a hitch assistance system (also referred to as a "hitch assist" system or a "hitching assistance" system) for a vehicle 12. As illustrated in the system diagram of FIG. 2, various sensors and devices obtain or otherwise provide vehicle status-related information. According to one aspect of the present disclosure, the hitch assist system 10 for assisting in aligning the vehicle 12 for hitching with a trailer 16 comprises a steering system 20 that adjusts a vehicle steering angle, via a braking system 70 that adjusts a vehicle speed, an imaging system 18 that receives image data 55 of a drawbar assembly 110 and a controller 26. The controller 26 is configured to detect an edge 116 of the drawbar assembly 110 from the image data 55, target a hitch point 121 at a fixed offset 118 from the edge 116 and a fixed point on the vehicle 12, and maneuver, via the steering and braking systems 20, 70, the vehicle 12 along a path 32 to align the hitch point 121 with a coupler 14 of the trailer 16.

This information includes positioning information from a positioning system 22, which may include a dead-reckoning device 24 or, in addition or as an alternative, a global positioning system (GPS), to determine a coordinate location of the vehicle 12 based on the one or more locations of the devices within the positioning system 22. In particular, the dead-reckoning device 24 can establish and track the coordinate location of the vehicle 12 within a localized coordinate system 82 based at least on vehicle speed and steering angle S. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor array 54 or an array thereof, and other vehicle sensors and devices, may provide sensor signals or other information, such as sequential images of a trailer 16, including the detected coupler 14, that the controller 26 of the hitch assist system 10 may process with various routines to determine the height and position of coupler 14.

Figure 2:
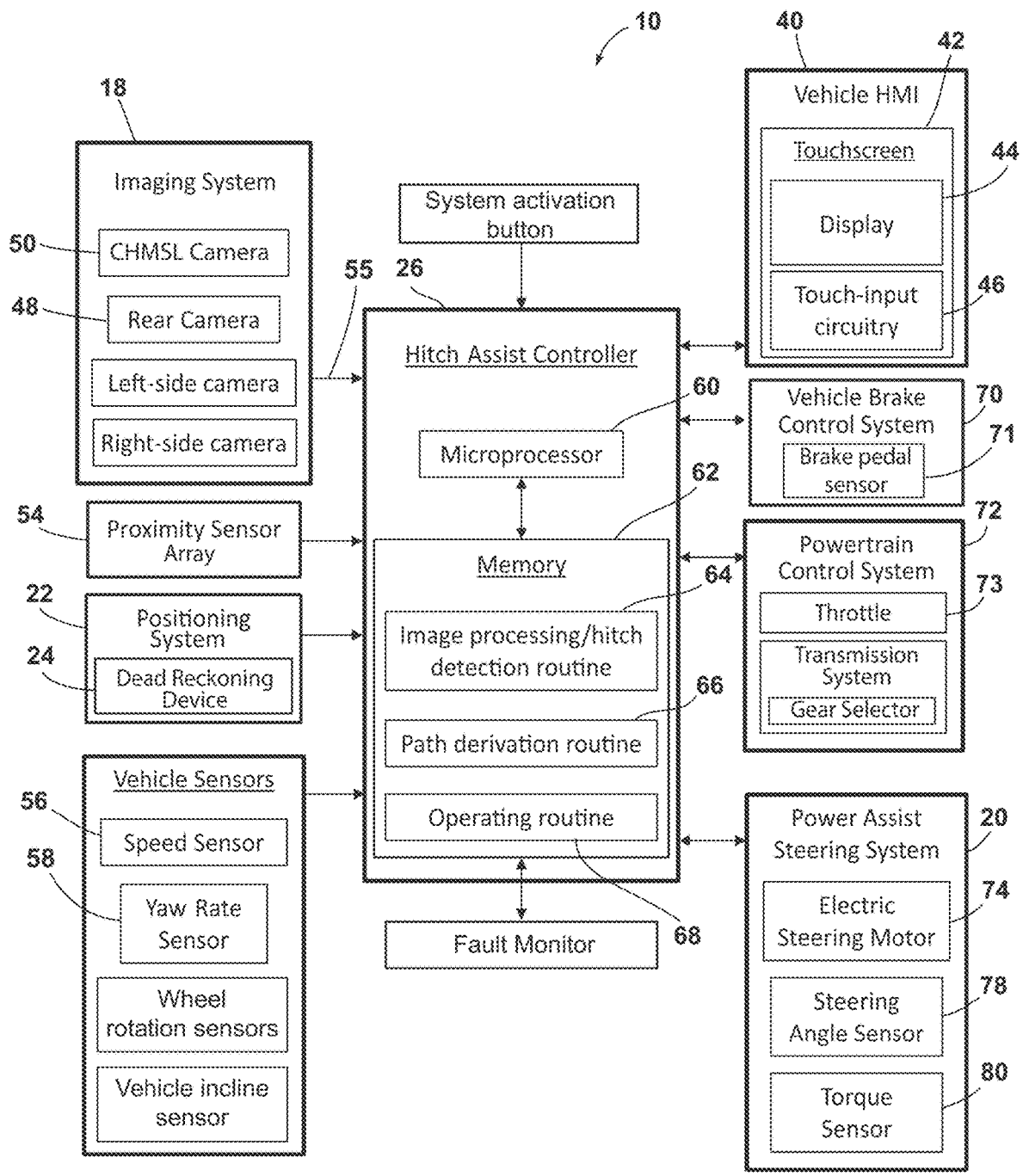
FIG. 2 is a diagram of a system, according to an aspect of the disclosure, for assisting in aligning the vehicle with a trailer in a position for hitching the trailer to the vehicle.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle S. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command may be provided by the hitch assist system 10 for autonomously steering during a trailer hitch alignment maneuver and may, alternatively, be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and, therefore, indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
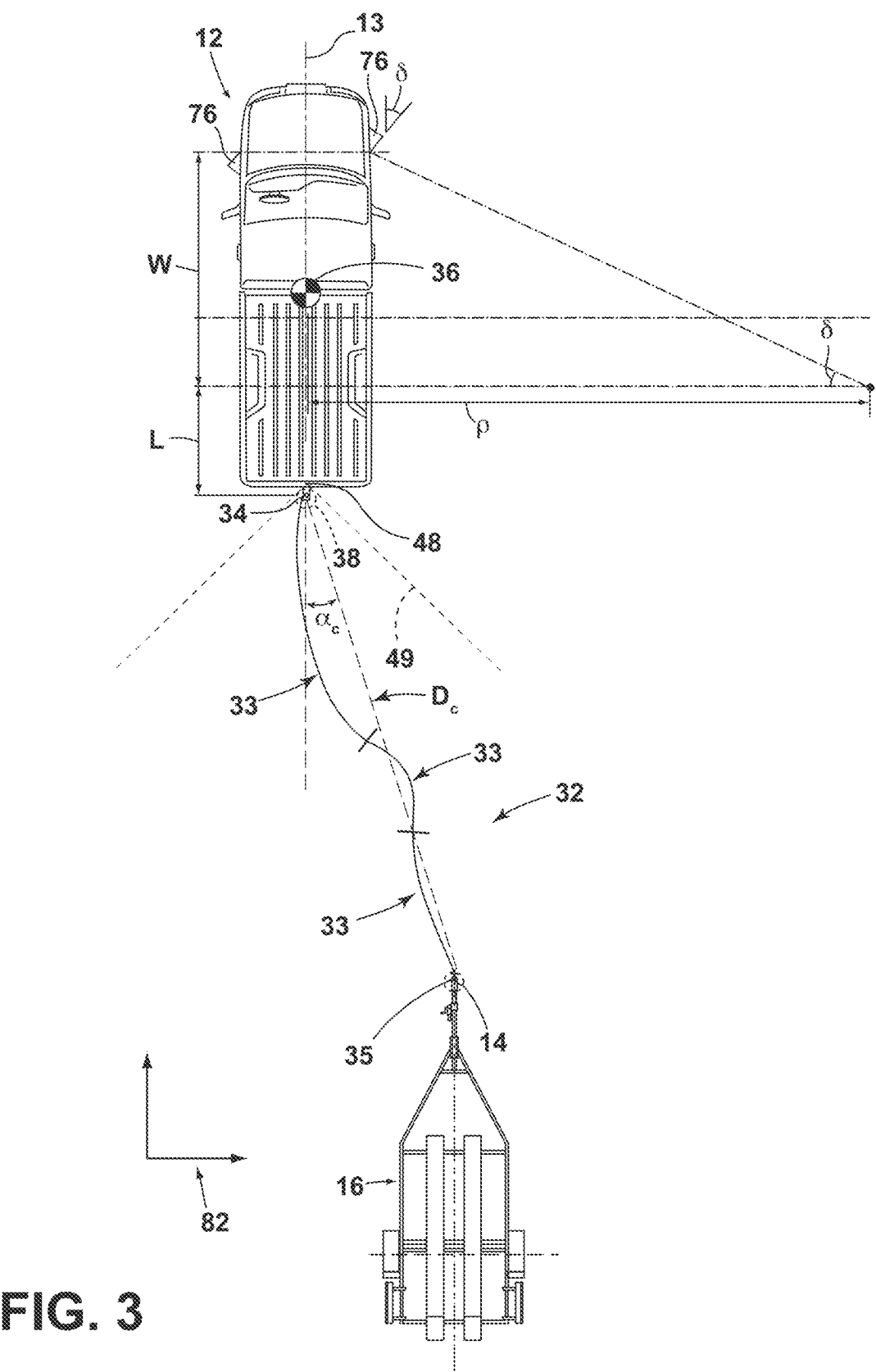
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle α. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for an impact with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated impact with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent impact with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like, can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like, that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which, in the illustrated examples, include rear camera 48 and center high-mount stoplight (CMHSL) camera 50, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48 and 50 included in imaging system 18 can be positioned to generally overlap in their respective fields of view, which may correspond with rear camera 48 and center high-mount stoplight (CMHSL) camera 50, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view denoted generally at 49, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48 and 50 within imaging system 18. In either example, the image processing routine 64 can include information related to the positioning of any cameras 48 and 50 present on vehicle 12 or utilized by system 10, including relative to the center 36 (FIG. 1) of vehicle 12, for example, such that the positions of cameras 48 and 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein may generally be used for purposes of vehicle control, such as under control of the user, including potentially with assistance of an on-board computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of a number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers, in general. In another embodiment, a marker in the form of a sticker, or the like, may be affixed with trailer 16 in a specified position relative to coupler 14 in a manner similar to that which is described in commonly assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 results in a change to the particular image within the data 55 that can improve the resolution or move the coupler 14 relative to the remaining portions of trailer 16 such that the coupler 14 can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis of vehicle 12. Image processing routine 64 can also be configured to identify the trailer 16 overall and can use the image data of trailer 16, alone or in combination, with the image data of coupler 14, to determine the orientation or heading 33 of trailer 16. In this manner, the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without unintentional contact between vehicle 12 and trailer 16 and may further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius p for vehicle 12 according to the equation:

$$\rho = \frac{W}{\tan\delta}, \qquad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{W}{\tan\delta_{max}}. \qquad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead-reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement $\Delta x$ of coupler 14 in a driving direction by determining the movement of coupler 14 in the vertical direction $\Delta y$ that will be needed to receive hitch ball 34 within coupler 14. Such functionality is discussed further in co-pending, commonly-assigned U.S. Pat. Nos. 9,821,845 and 10,870,323, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle $\delta$, as dictated by path 32, depending on the position of vehicle 12 therealong. It is additionally noted that in an embodiment, the path 32 may comprise a progression of steering angle $\delta$ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing a final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such as a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead-reckoning device 24 can be used to track the location of vehicle 12 in its movement along path 32 toward the initially-derived endpoint 35.

Figure 4:
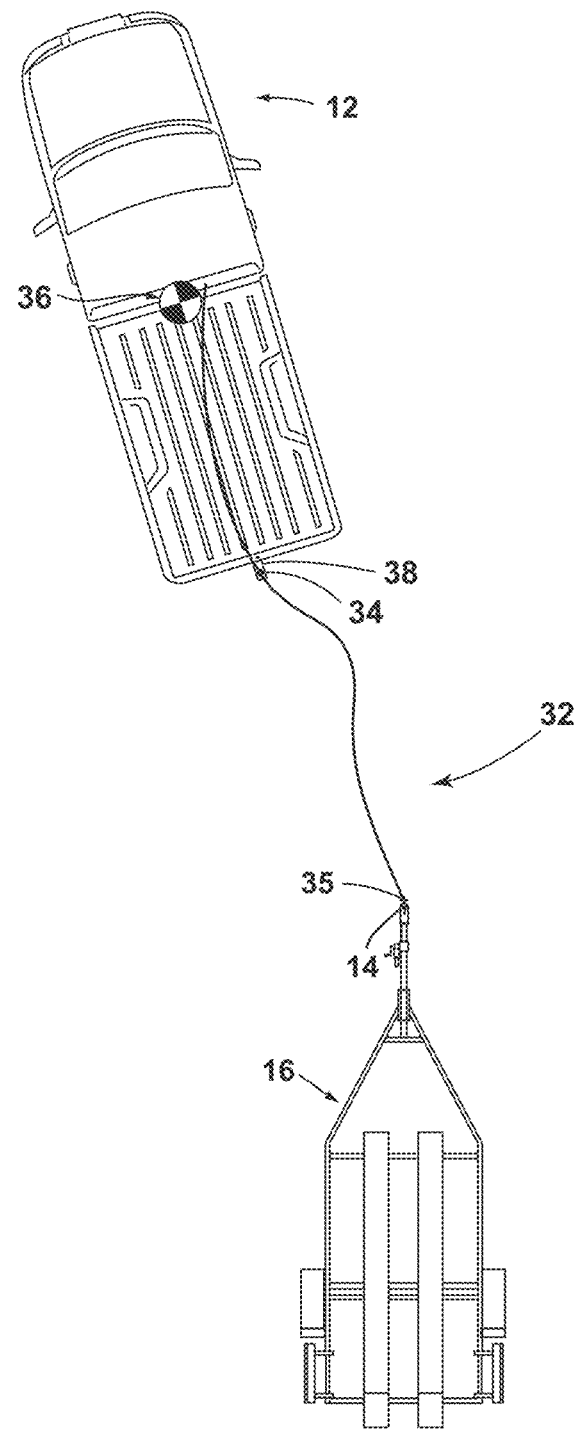
FIG. 4 is an overhead schematic view of the vehicle during a subsequent step of the alignment sequence with the trailer.
Figure 5:
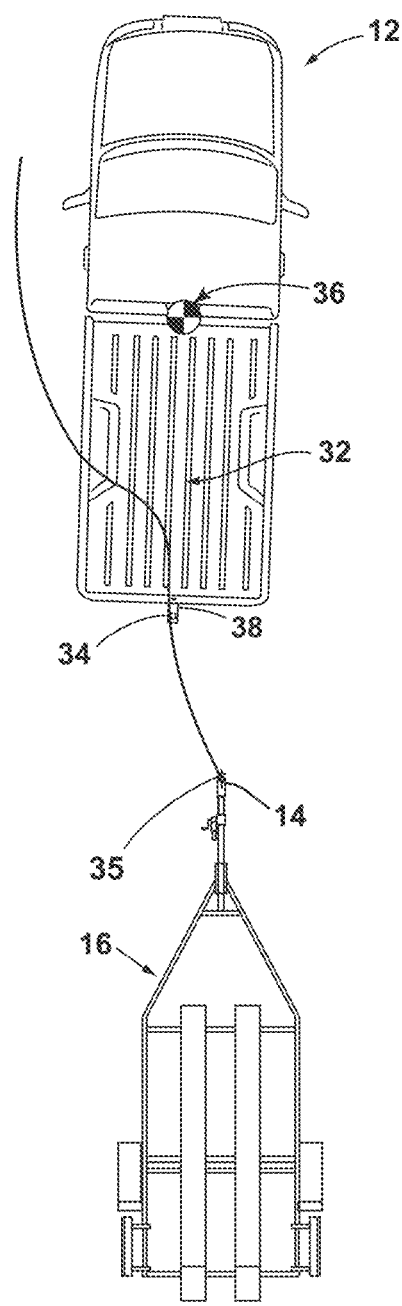
FIG. 5 is an overhead schematic view of the vehicle during a subsequent step of the alignment sequence with the trailer.
Figure 6:
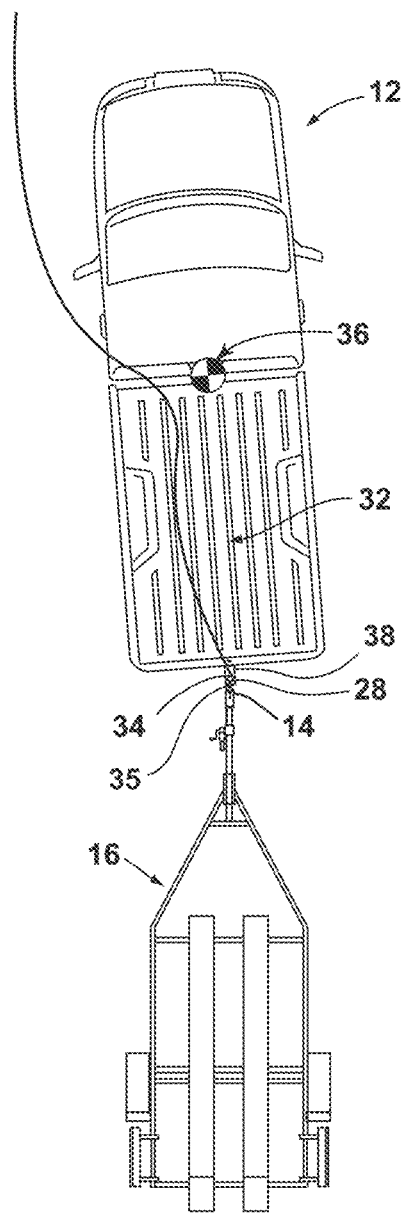
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified, and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14, constantly or once available, during execution of operating routine 68, including as coupler 14 comes into clearer view of a rear camera 48, with continued movement of vehicle 12 along path 32. As discussed above, the position of vehicle 12 can also be monitored by dead-reckoning device 24 with the position 28 of coupler 14 being continuously updated and fed into path derivation routine 66 in case path 32 and or endpoint 35 can be refined or should be updated (due to, for example, distance $D_c$, or offset angle $\alpha_c$ information due to closer resolution or additional image data 55), including as vehicle 12 moves closer to trailer 16, as shown in FIGS. 4 and 5. Still further, the coupler 14 can be assumed to be static such that the position of vehicle 12 can be tracked by continuing to track the coupler 14 to remove the need for use of the dead-reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$, of coupler 14 to converge the known relative position of hitch ball 34 to the desired position 38 thereof relative to the tracked position 28 of coupler 14, as discussed above and shown in FIG. 6.

During an assisted hitching operation, such as in the example described with respect to FIGS. 4-6, system 10 requires a minimum amount of longitudinal distance between the vehicle 12 and the trailer 16 to control movement of vehicle 12 with a level of precision desired to achieve the desired final position of hitch ball 34 with respect to coupler 14 (i.e., without overshooting the desired final location, such that hitch ball 34 moves past the coupler 14, or otherwise ending operating routine 68 with hitch ball 34 positioned relative to coupler 14 such that manual movement of trailer 16 is required). The required minimum distance can vary but is generally influenced by the requirements of image processing routine 64, as well as the requirements of speed sensor 56, the responsiveness of the throttle 73 and vehicle powertrain control system 72, as well as the general processing speed of controller 26 of other components of system 10. In one example, image processing routine 64 may require a minimum travel distance for calibration thereof, including to accurately identify coupler 14 and to assist in tracking of the movement of vehicle 12. As discussed further below, the particular minimum distance can be estimated for a given implementation of system 10, based on known values or estimates for such factors. In general, because of the minimum travel distance requirement, if vehicle 12 is at a standstill with insufficient longitudinal distance remaining between hitch ball 34 and coupler 14, the system 10 is programmed to either not initiate operating routine 68 or, if already started, abort operating routine 68 to avoid overshooting the final target position such that hitch ball 34 moves past endpoint 35. In various examples, vehicle 12 may be brought to a standstill for reasons other than operating routine 68 causing the application of the vehicle brakes using the vehicle brake control system 70. In particular, vehicle 12 may come to a standstill before reaching the desired final target position due to uneven terrain acting on the vehicle wheels 76 or 77, or by the vehicle brake control system 70 being activated by a brake pedal sensor 71 responsive to manually applied pressure to the vehicle brakes by the driver. Because such events can cause a vehicle 12 standstill at any point along path 32, the present system 10 provides the ability to detect such a standstill event and to address it appropriately given the capabilities and requirements of system 10. In various examples, system 10 can address an early standstill by aborting, pausing, or automatically rectifying the standstill condition.

As mentioned above, the "longitudinal control" in an assisted hitching maneuver is the portion of the movement of vehicle 12 along path 32 controlled by the vehicle powertrain control system 72 and the vehicle brake control system 70 with the "longitudinal control" being the portion controlled by the power assist steering system 20. It is to be understood that the lateral control requires movement of the vehicle such that the two control schemes operate together to move vehicle 12 along the path 32. In this respect, the longitudinal alignment of the path 32 with the coupler 14 is dictated by the longitudinal control (i.e., by the steering system 20) and the final stopping point of vehicle 12 along path 32 is dictated by the longitudinal control. In this respect, the final stopping point of the vehicle 12 along path 32 determines the alignment in the direction of travel between hitch ball 34 and coupler 14. In this manner, system 10 may be able to move vehicle 12 to the final target position in a precise manner, for example, such that trailer 16 does not have to be manually repositioned by the user, but can simply be lowered onto hitch ball 34. In one implementation of system 10, the accuracy in final longitudinal alignment of hitch ball 34 with coupler 14 can be within 1 cm of a completely aligned position (center-to-center).

The imaging system 18 may not identify the hitch ball 34 in the image data 55. The system 10 employs an alternative detection solution if the algorithm does not successfully detect a circular shape that is indicative of a hitch ball 34. The hitch assist system 10 detects a drawbar assembly 110 disposed within a receiver 112 of the trailer hitch 114. Specifically, the hitch assist system 10 estimates a position of a far edge 116 of the drawbar assembly 110. A nominal, or fixed, offset value 118 is subtracted from the position of the far edge, which is used to calculate or derive an estimated position for the hitch center 120. This calculated value is indicative of a hitch center 120, which is used during vehicle movement to establish a hitch point 121 on the path 32 to align the hitch ball with the coupler 14. Stated differently, the hitch point 121 may be indicative of the hitch center 120. In at least one other instance, the hitch point 121 may be adjacent, proximate, or aligned with the hitch center 120 based on operating variables of the hitch assist system 10.

Initially, the hitch assist system 10 searches for a circular shape indicative of the hitch ball 34 in the rear camera image data 55, as described previously. The hitch assist system 10 expects the hitch ball to be laterally aligned with the center 36 of the vehicle 12 within a range 122 of distance from a vehicle bumper 124, in which the range 122 includes a maximum and a minimum distance to detect the hitch ball 34. If the hitch ball 34 is detected by the hitch assist system 10, the hitch assist system 10 proceeds as described previously. If the hitch ball 34 is not detected, the hitch assist system 10 uses a secondary algorithm that processes the hitch ball 34 in the image data 55. In an instance of the hitch ball 34 being detected as a circular shape, the hitch assist system 10 estimates the center 120 of the hitch ball 34 as a center of the circular shape identified in the image data 55. The hitch assist system 10 uses a distance from the center 120 of the hitch ball 34 to a fixed point, such as the center 36 of the vehicle 12 to determine the endpoint 35 of path 32, to align the hitch ball 34 to the coupler 14. While described as the center 36 of the vehicle 12, the fixed point may be any stationary point on the vehicle 12.

Figure 7:
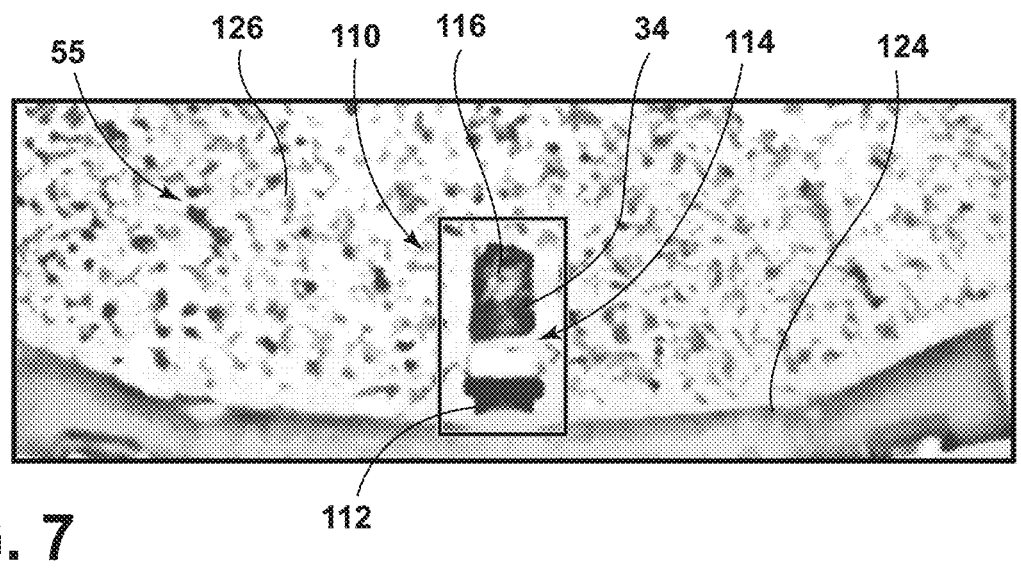
FIG. 7 is an overhead perspective view of the vehicle showing an identification of a drawbar assembly.
Figure 8:
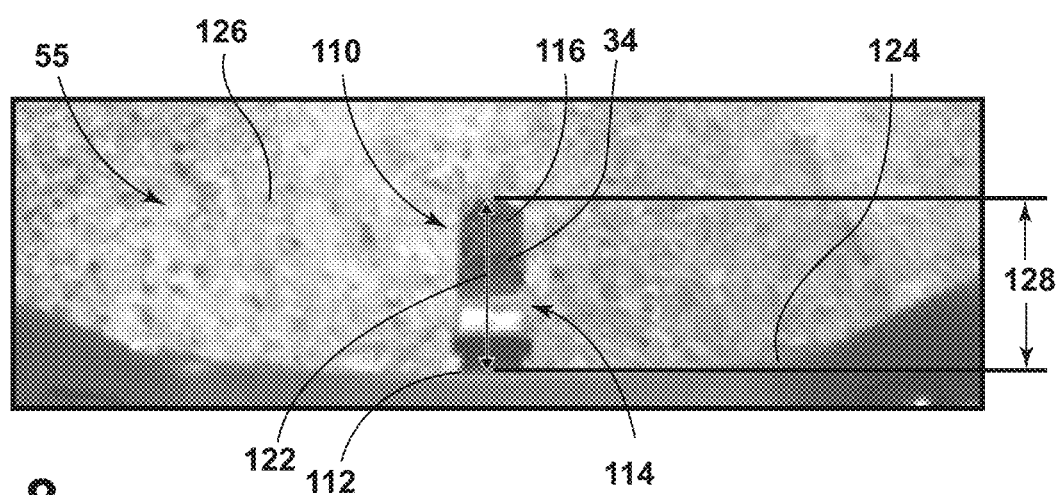
FIG. 8 is an overhead perspective view of the vehicle showing a position of an edge of the drawbar assembly.
Figure 9:
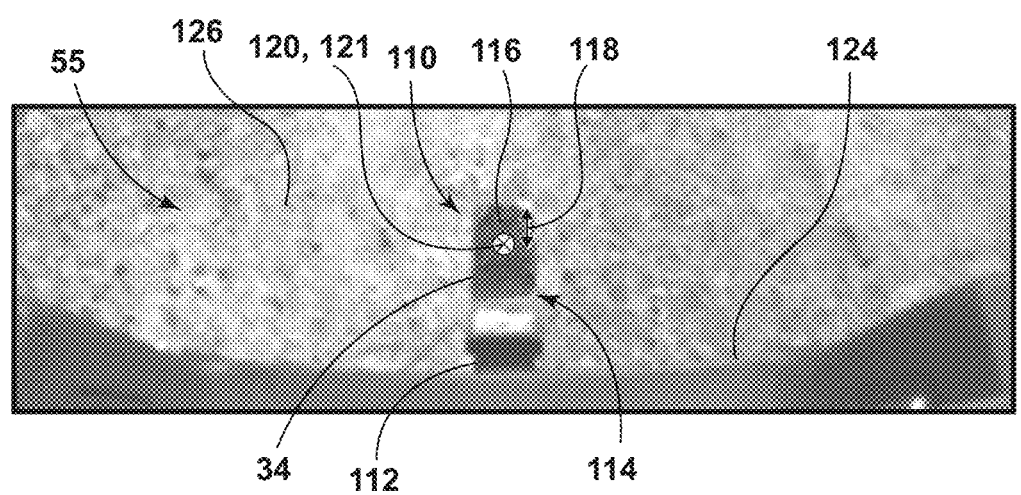
FIG. 9 is an overhead perspective view of the vehicle showing a hitch point at a fixed offset from the edge of the drawbar assembly.

FIGS. 7-9 depict image data 55, in which the hitch assist system 10 may not be able to identify the hitch ball 34. Specifically, the image data 55 in the instances shown in FIGS. 7-9 depict an instance in which the hitch ball 34 may not be distinguishable from other features in the image data 55, such as a ground surface 126. As stated above, the hitch assist system 10 detects the drawbar assembly 110 in the image data 55, if the hitch ball 34 is not detected by the hitch assist system 10, as shown in FIG. 7. The drawbar assembly 110 intersects the bumper 124 of the vehicle 12, and extends to a point within an expected range away from the bumper 124, as shown in FIG. 8. FIG. 9 depicts detection of the edge 116 of the drawbar assembly 110 of the image data 55. Once the edge 116 is identified, the hitch assist system 10 subtracts a nominal value from the edge 116 of the drawbar assembly 110 and sets the resulting position as the point to be aligned with the coupler 14. The nominal value may be an average distance from the edge 116 of a drawbar assembly 110 to the center 120 of the hitch ball 34 taken from a variety of drawbar assemblies 110. In this manner, the target center 120 is an approximation of where the center 120 of a hitch ball 34, if present or identified, would be located from the image data 55.

Figure 10:
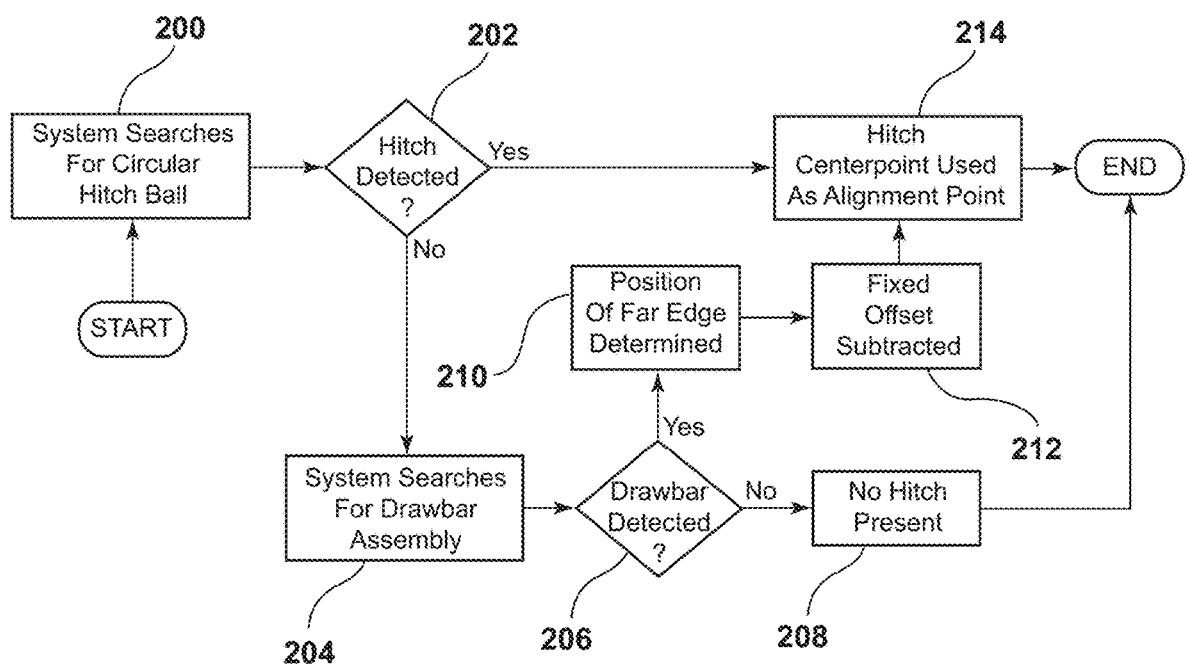
FIG. 10 is a flowchart of the system according to one aspect of the disclosure for assisting in selecting the hitch point for alignment with the trailer from the edge of the drawbar assembly.

FIG. 10 depicts a control logic flow diagram for the hitch assist system 10 to align a hitch ball 34 with a trailer 16. At 200, the hitch assist system 10 searches for a hitch ball 34, as described previously. At 202, the hitch assist system 10 determines if a hitch ball 34 is apparent in the image data 55 from the imaging system 18. If, at 202, the hitch assist system 10 detects a hitch ball 34, the hitch assist system 10 uses a center of the hitch ball 34, as described previously. If, at 202, the hitch assist system does not identify a hitch ball 34 in the image data 55, the hitch assist system 10 searches the image data 55 for the drawbar assembly 110 at 204. If, at 206, the hitch assist system 10 detects the drawbar assembly 110 in the image data 55, the hitch assist system 10 determines that the hitch ball 34 is installed on the vehicle 12, despite a lack of a clear, circular shape in the image data 55. If, at 206, the hitch assist system 10 does not detect a drawbar assembly in the image data 55, the hitch assist system 10 determines that no hitch is installed at 208. If, at 208, no hitch is installed on the vehicle 12, the hitch assist system 10 may abort due to a lack of a drawbar assembly 110 attached to the vehicle 12. In at least one other embodiment, if, at 206, the hitch assist system 10 determines that no hitch is installed on the vehicle 12, the hitch assist system 10 proceeds with a saved value from memory. The saved value may be indicative of, even if a hitch ball 34 was not detected, a drawbar or assembly present on the vehicle 12 due to limits of image processing techniques. Referring back to 206, the hitch assist system 10 determines if a drawbar assembly 110 is detected in the image data 55. If, at 206, a drawbar assembly 110 is detected, the hitch assist system 10 determines a distance 128 of the far edge 116 of the vehicle 12 at 210. The far edge 116, at 210, may be indicative of a point on an edge being farthest from the vehicle 12 on the drawbar assembly 110 in the image data 55, and is also indicative of a total length 128 of the drawbar assembly 110. The far edge 116, determined at 210, may be extrapolated based on a detected or assumed height, being a distance between the camera and the drawbar assembly 110 as well as a height of the vehicle 12, and a counted number of pixels from the fixed point on the vehicle 12, for example, an edge of a rear bumper 124 to the far edge 116. The number of pixels may be translated to an estimated distance in a ground plane. The far edge 116 of the drawbar assembly 110 is not the hitch center 120 that the hitch assist system 10 aligns the hitch ball 34 to the coupler 14. At 212, the hitch assist system 10 estimates a location of the center 120 by subtracting a fixed offset 118, equal to the nominal value, from the far edge 116 of the drawbar assembly 110. The fixed offset 118, at 212, may be an average distance considering a variety of common hitch assemblies. This provides a reasonable estimation for an endpoint 35 to align the hitch ball 34 for attachment with the coupler 14. Using the fixed offset at 212, the hitch assist system 10 is able to identify and align a drawbar assembly 110 with a coupler 14 despite noise in the image data 55 affecting visibility of the hitch ball 34 in the image data 55 from the imaging system 18. Therefore, the fixed offset 118 at 212 may provide a significant reduction in aborts of the hitch assist system 10, or misalignment between the hitch ball 34 and coupler 14 due to improper hitch detection in the image data 55 from the imaging system 18. At 214, the center 120 of the hitch ball 34, whether calculated with the fixed offset 118, or during normal detection is used as the endpoint 35.

Referring to FIG. 11, the fixed offset 118 may also be used by the hitch assist system 10 to align a specific hitch type that may not include a hitch ball 34 and coupler 14, for example, as a pintle hitch 130 and lunette ring 132. The fixed offset 118 used by the hitch assist system 10 is beneficial to align a pintle hitch 130 and lunette ring 132 because the hitch assist system 10 does not detect a hitch ball 34, as the pintle hitch 130 lacks a circular shape of a hitch ball 34 being at least a visible hitch ball or one that actually engages with a coupler. Additionally, the hitch assist system 10 may not ordinarily detect the lunette ring 132, because the lunette ring 132 is different in visual appearance as compared to the coupler 14. The lunette ring 132 is different in visual appearance because the detected features of the lunette ring 132, such as a front of the lunette ring 132, appear different than features of the coupler 14. If the hitch assist system 10 detects either the pintle hitch 130 or the lunette ring 132, error in the exact positioning of their respective centers may result. This may be due to differing styles, sizes and uses of the pintle hitch 130 and lunette ring 132. Thus, final alignment of the pintle hitch 130 and lunette ring 132 may require modification to align such features, particularly to avoid instances where the hitch assist system 10 calculates a path 32 that causes contact between the pintle hitch 130 and the lunette ring 132. As depicted schematically in FIGS. 12 and 13, and as will be explained in more detail below, the hitch assist system 10 may also include a contact detection system that detects contact between the pintle hitch 10 attached with the drawbar assembly 110 and a lunette ring 132 comprising an operative portion of the coupler 14, and, responsive to contact between the pintle hitch 130 and lunette ring 132, control the braking system 70 to bring the vehicle 12 to a stop.

Figure 14:
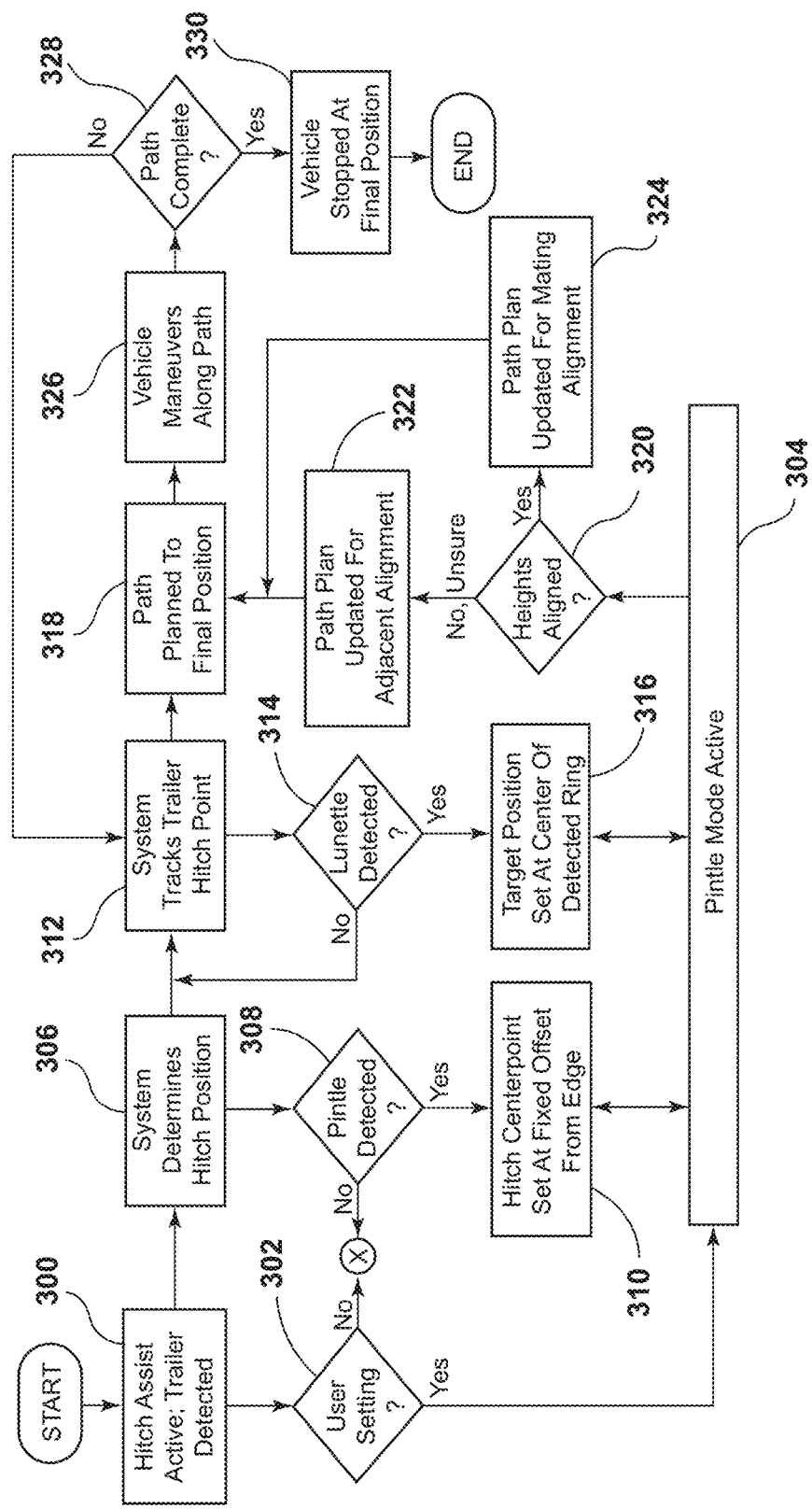
FIG. 14 is a flowchart of the system, according to one aspect of the disclosure, for assisting in selecting the adjusted position of the specific hitch type with the trailer, according to one aspect of the disclosure.

FIG. 14 depicts a flow diagram of control logic for the hitch assist system 10 to use the fixed offset 118, discussed above, to align a specific hitch type, such as a pintle hitch 130, with a corresponding lunette ring 132. At 300, the hitch assist system 10 is activated, and the hitch assist system 10 detects a position of a trailer 16 in proximate the vehicle 12. A user may also use the Human-Machine Interface ("HMI") 40 settings to inform the hitch assist system of a pintle hitch 130 and lunette ring 132 hitching operation at 302. If the user activates settings to alert the hitch assist system 10 to a pintle hitch 130 and lunette ring 132 hitching operation, at 302, the hitch assist system 10 adapts the detection algorithm, trailer detection algorithm, and path planning to activate, at 304, a pintle mode of the hitch assist system 10. If, at 302, the user does not activate the pintle mode, the hitch assist system 10 proceeds with determining a pintle hitch 130 and lunette ring 132 hitching operation as described with reference to FIG. 10. Alternatively, the hitch assist system 10 may be configured to detect previously known trailers 16 and utilize stored information to determine a hitch type. At 304, several methods may be employed to indicate if the hitch assist system 10 is being used on a pintle hitch 130 and lunette ring 132 hitching operation, which affects algorithms and the path 32.

At 306, the hitch assist system 10 searches for a hitch ball 54 or a pintle hitch 130 using a rear view camera 48 of the imaging system 18. If a hitch ball 34 is detected at 306, the hitch assist system 10 determines a hitch position based on a center of a hitch ball 34, as this is used to establish the endpoint 35 for the hitch assist system 10 to use in the path planning. If, at 308, the hitch assist system 10 detects a pintle hitch 130, based on the image data 55 from the imaging system 18, the hitch assist system 10 may activate the pintle mode at 304 to adjust the path 32 for a pintle hitch 130 and lunette ring 132 hitching operation. Identification of a pintle hitch 130 at 308 may be achieved using hitch recognition in conjunction with a database of user hitch profiles. If, at 308, a pattern from the image data 55 matches a drawbar assembly 110 that was cataloged as a pintle-style in a database, the hitch assist system 10 automatically selects the pintle hitch 130. If, at 308, the hitch assist system 10 detects a pintle hitch, the determination of the endpoint 35 differs from a hitch ball 34 detection algorithm, described above.

With a hitch ball detection, a center of a detected circle (e.g., from a Hough transform) is used as the endpoint 35 for the hitch assist system 10, as described above. However, with a pintle hitch 130, the fixed offset 118, described above, is subtracted off the total length 128 of the hitch at 310. Again, the far edge 116 is measured relative to a stationary point, on the vehicle 12, and the fixed offset 118 is subtracted, at 310, to determine the endpoint 35. To increase accuracy, the hitch assist system 10 may additionally ask a user to close the pintle hitch 130 for measurement of the far edge 116. At 312, the hitch assist system 10 detects target coordinates to align the hitch point by detecting a circular appearance of the coupler 14. At 312, with a traditional trailer 16, the hitch point is the center of the coupler 14, such that at a final position of the path 32, the hitch ball 34 is directly under the hitch point, as defined. If, however, at 308, a pintle hitch 130 is identified, the hitch point may no longer be the center of a ball-receiving trailer coupler 14. In this type of connection, a lunette ring 132 may be used as the point of attachment for the trailer 16. If a lunette ring 132 is detected, at 314, the hitch assist system 10 infers that a pintle hitch 130 and lunette ring 132 hitching operation has been initiated, and the pintle mode at 304 is initiated (if not already initiated by the other methods).

If at 314, a lunette ring 132 is detected, the hitch assist system 10 detects a boundary of the lunette ring 132, using a Hough transform or other method at 316. At 316, the hitch point is a center 136 of the lunette ring 132 detected at 314. Because of a camera perspective of the imaging system 18, the lunette ring 132 is as an ellipse, rather than a circle. At 318, the path 32 is calculated from a current vehicle 12 position to a final position, where the drawbar assembly 110 will align with the hitch point, regardless of hitch type as described above. If a pintle mode is active at 304, the hitch assist system 10 calculates a height from the ground of both the pintle hitch 130 and the lunette ring 132 at 320. At 320, the height is from a ground surface to each of the pintle hitch 130 attached with the drawbar assembly 110 and the lunette ring 132 comprising an operative portion of the coupler 14. At 320, the hitch assist system 10 compares the height from the ground surface from each of the pintle hitch 130 and the lunette ring 132. If at 320, the hitch assist system 10 infers that the heights of the pintle hitch 130 and lunette ring 132 are not aligned, the hitch assist system 10 plans the path 32 to align the pintle hitch 130 adjacent to, but without intersecting, the lunette ring 132 at 322. Stated differently, if at 320, heights between the pintle hitch 130 and lunette ring 132 is uncertain, or is offset (such that the trailer tongue height must be adjusted before a connection to the hitch is possible), the hitch assist system 10 alters the path 32 at 322 to change the path 32 from the center 136 of the lunette ring 132 to a point adjacent to the lunette ring 132. The point may be to a side of the lunette ring 132, which allows for a convenient hitching setting a tongue height. The point may also be in front of the lunette ring 132, which also provides an easy connection, or a manual reposition into a mating alignment. Alternatively, the hitch assist system 10 could adapt the path 32 at 322 to stop at a set distance in a front of the trailer 16 to allow for a height adjustment.

If at 320 the heights of the pintle hitch 130 and lunette ring 132 are the same or there is no height offset between the pintle hitch 130 and lunette ring 132 indicating that the heights are aligned, the hitch assist system 10 infers that the drawbar assembly 110 is ready for connection and the path 32 is updated to mate the pintle hitch 130 and lunette ring 132 at 324. The hitch assist system 10 prepares to complete the automated maneuver, at 318, such that the pintle hitch 130 aligns to the center 136 of the lunette ring 132 at 318. The hitch assist system 10 maneuvers the vehicle to the endpoint 35 at 326. The hitch assist system 10 determines if the vehicle has completed the maneuver along the path at 328. If the hitch assist system 10 determines that the vehicle 12 has maneuvered along the path, at 328, the hitch assist system 10 activates the braking system to stop the vehicle 12 at the endpoint 35 at 330. If at 328, the hitch assist system 10 determines that the vehicle 12 has not maneuvered along the path to the alignment point, the hitch assist system 10 returns to track the trailer hitch point at 312.

Using the control logic discussed above for the hitch assist system 10 further advantages may be realized. The hitch assist system 10 includes a contact detection algorithm, in an instance where the pintle hitch 130 is closed, and will thus contact the lunette ring 132. If contact is detected, the hitch assist system 10 applies braking and completes the maneuver. The hitch assist system 10 may also include a verification notification indicative of verification instructions to mate the pintle hitch and lunette ring, in order to ensure the system can proceed with a mating alignment. The hitch assist system 10 automatically maneuvers along the path plan 32, and outputs a notification once the maneuver at 330 is complete.

With this solution, the hitch assist system 10 may provide an accurate or best workable alignment for a pintle hitch 130 and lunette ring 132 connection system. System 10 allows for selection of differing styles or types of hitch connections in order to adapt performance and functionality of the hitch assist system 10. The hitch assist system 10 provides adjacent alignment, instead of vertical alignment, when a pintle hitch 130 and lunette ring 132 height offset exists, and performs a full, vertical alignment when a pintle hitch 130 and lunette ring 132 height alignment exists.

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer, comprising:
    a steering system that adjusts a vehicle steering angle;
    a braking system that adjusts a vehicle speed;
    an imaging system that receives image data of a drawbar assembly; and
    a controller that detects an edge of the drawbar assembly from the image data, targets a hitch point at a fixed offset from the edge and a fixed point on the vehicle, and maneuvers, via the steering and braking systems, the vehicle along a path to align the hitch point with a coupler of the trailer.

2. The system of claim 1 further comprising an interface networked with the imaging system and the controller such that interaction with the interface activates a mode to indicate a specific hitch type to at least one of the imaging system and the controller.

3. The system of claim 2, wherein the mode includes matching the image data to an image database such that the controller determines a type of the coupler of the trailer from the image data.

4. The system of claim 2 further comprising a contact detection system, wherein:
the controller detects, via the contact detection system, contact between a pintle hitch attached with the drawbar assembly and a ring comprising an operative portion of the coupler, and, responsive to contact between the pintle hitch and ring, controls the braking system to bring the vehicle to a stop.

5. The system of claim 4, wherein the controller, responsive to contact between the pintle hitch and the ring, outputs a notification to the interface indicative of verification instructions to mate the pintle hitch and the ring.

6. The system of claim 1, wherein the controller, responsive to the image data indicative of the edge of the drawbar assembly, calculates, via the imaging system, a height from a ground surface to each of a pintle hitch attached with the drawbar assembly and a ring comprising an operative portion of the coupler, and compares the height from the ground surface from each of the pintle hitch and the ring.

7. The system of claim 6, wherein the controller, responsive to the height of each of the pintle hitch and the ring being outside a predetermined range of each other, alters the path from the hitch point to a point proximate an exterior of the ring.

8. A hitch assist system for a vehicle, comprising:
an imaging system configured to detect an edge of a drawbar assembly being receivable in a hitch receiver as image data; and
a controller configured to, responsive to the image data being indicative of the edge of the drawbar assembly, target a hitch point by applying an offset value to the edge, and maneuver, via steering and braking systems, the vehicle along a path to move the hitch point toward a predetermined endpoint.

9. The hitch assist system of claim 8 further comprising an interface networked with the imaging system and the controller such that interaction with the interface activates a mode to indicate a specific hitch type to at least one of the imaging system and the controller.

10. The hitch assist system of claim 9, wherein the specified mode includes matching the image data to an image database such that the controller determines a type of the coupler of a trailer from the image data.

11. The hitch assist system of claim 8 further comprising a contact detection system wherein:
the controller is further configured to detect, via the contact detection system, contact between a pintle hitch attached with the drawbar assembly and a ring comprising an operative portion of the coupler, and, responsive to contact between the pintle hitch and ring, controls the braking system to bring the vehicle to a stop.

12. The hitch assist system of claim 11, wherein the controller is further configured to, responsive to contact between the pintle hitch and the ring, output a notification to an interface networked with the controller, the notification being indicative of verification instructions to mate the pintle hitch and the ring.

13. The hitch assist system of claim 8, wherein the controller is further configured to, responsive to the image data indicative of the edge of the drawbar assembly, calculate, via the imaging system, a height from a ground surface to each of a pintle hitch attached with the drawbar assembly and a ring comprising an operative portion of the coupler, and compare the height from the ground surface from each of the pintle hitch and the ring.

14. The hitch assist system of claim 13, wherein the controller is further configured to, responsive to the height of each of the pintle hitch and the ring being outside a predetermined height range of each other, alter the path from a center of the ring to a point proximate the ring.

15. A method for aligning a vehicle for hitching with a trailer, comprising:
detecting an edge position of a drawbar assembly in image data received from a vehicle imaging system;
establishing an alignment position associated with the drawbar assembly by applying an offset value to the edge position; and
controlling steering and braking systems to maneuver the vehicle along a path to move the alignment position toward a predetermined endpoint.

16. The method of claim 15 further comprising detecting a coupler of the trailer, wherein the predetermined endpoint is a center of the coupler.

17. The method of claim 15 further comprising activating a mode to indicate a specific hitch type using an interface networked with the vehicle imaging system.

18. The method of claim 15 further comprising detecting via contact detection system, contact between a pintle hitch attached with the drawbar assembly and a ring comprising an operative portion of a coupler of the trailer, and controlling the braking system to bring the vehicle to a stop responsive to the contact.

19. The method for of claim 15 further comprising outputting a notification to an interface responsive to contact between a pintle hitch coupled with the vehicle and a ring coupled with the trailer, the notification being indicative of verification instructions to mate the pintle hitch and the ring.

20. The method of claim 15 further comprising calculating, via the vehicle imaging system, a height from a ground surface to each of a pintle hitch attached with the drawbar assembly and a ring comprising an operative portion of a coupler of the trailer responsive to the image data indicative of the edge position of the drawbar assembly, comparing the height from the ground surface for each of the pintle hitch and the ring, and altering the path from the center position to a point proximate an exterior of the ring responsive to the height of each of the pintle hitch and the ring being outside of a predetermined height range of each other.

* * * * *